UNITED STATES PATENT OFFICE.

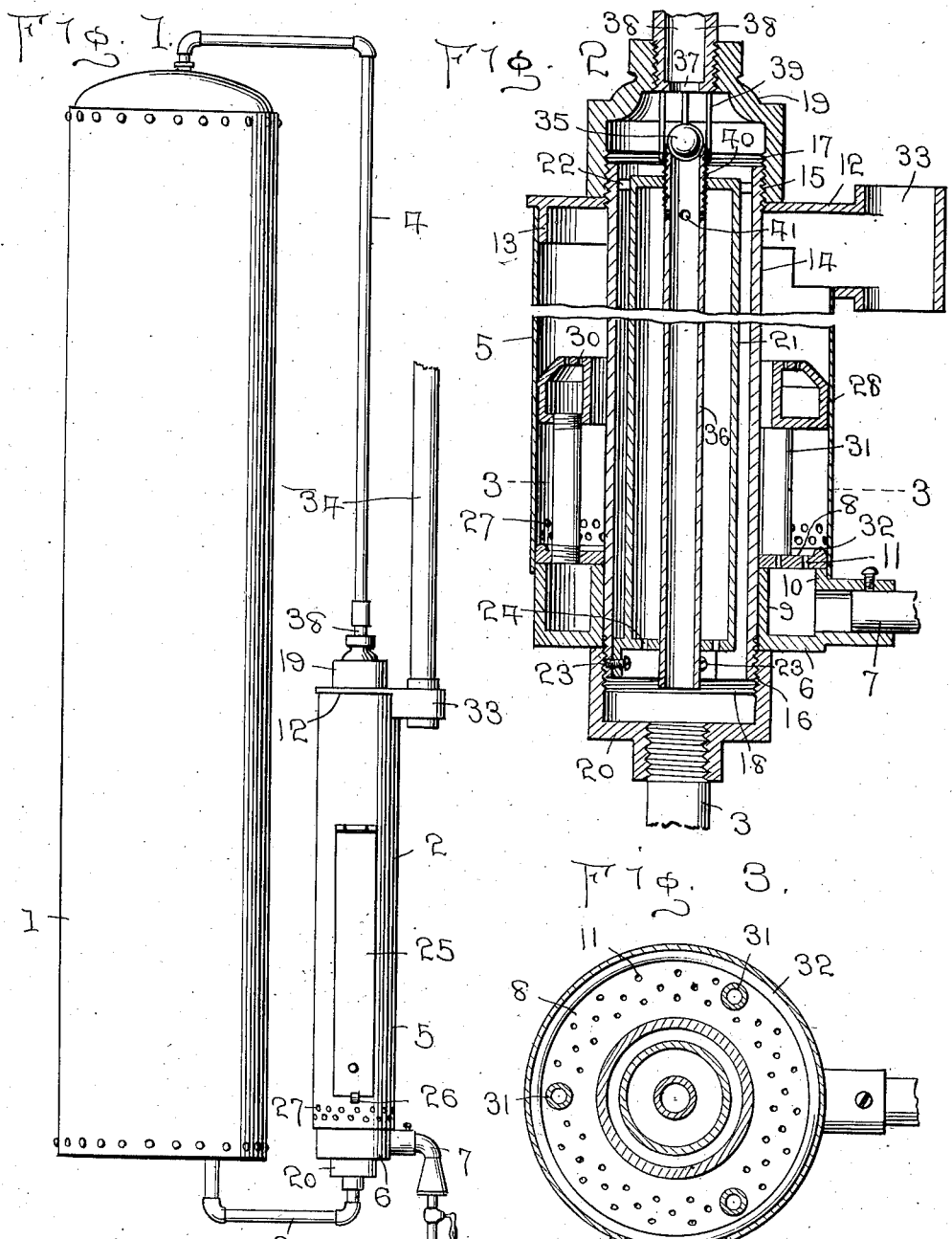

FRANK H. WHEELOCK, OF WASHINGTON, DISTRICT OF COLUMBIA.

HEATING DEVICE.

1,026,013. Specification of Letters Patent. Patented May 14, 1912.

Application filed August 15, 1911. Serial No. 644,198.

*To all whom it may concern:*

Be it known that I, FRANK H. WHEELOCK, a citizen of the United States, residing at Washington, District of Columbia, have invented a new and useful Heating Device, of which the following is a specification.

My invention relates to new and useful improvements in heating devices and is more particularly an improvement over Patent No. 864,760, dated August 27, 1907, and acquired by me by deed of assignment.

The prime object of this invention, among others, is to provide means within a casing for retarding or confining the products of combustion resulting in a more uniform commingling of the air with the gases, thus obtaining a much greater heat.

A further object is to so construct the bridge wall within the casing that the same may be used as an auxiliary burner when desired.

A further object is to provide means for causing the water to flow through the heating medium in a comparatively thin sheet.

A further object is to provide an adjustable tube through the center of the heater for conveying water through the heater in volume, and, a further object is to provide a valve which is adapted to normally close said tube and move into position to completely stop the flow of water through the heating device when water is being drawn from the tank.

Other objects and advantages will be hereinafter set forth and pointed out in the following specification.

In the accompanying drawings which are made a part of this application, Figure 1 is a side elevation of my improved heating device showing the same attached to a tank. Fig. 2 is an enlarged vertical sectional view through the heating device showing, portions thereof broken away, and, Fig. 3 is a transverse sectional view as seen on line 3—3, Fig. 2.

Referring to the drawings in which similar reference numerals designate corresponding parts throughout the several views, 1 indicates a tank which may be constructed in the usual or any preferred manner and used for containing hot water, while 2 indicates my improved heating device which is connected to the tank 1 at its lower end through a pipe 3 and at its upper end through the medium of a pipe 4.

The heating device proper comprises an outer casing 5, preferably of sheet metal, into the lower end of which fits a burner 6, the fuel entering said burner through a feed pipe 7 or from any suitable source. Fitting over the burner 6 is a removable ring 8 which fits on the flanges 9 and 10 of the burner and is provided with a series of openings 11, through which the gas passes from the burner. Fitting over the upper end of the casing 5 is a head plate 12, said plate having a depending flange 13 which fits within the casing and extending transversely through the burner and head plate is a tube 14, said tube being of sufficient length to extend beyond the burner and head and has its upper and lower ends provided with threads 15 and 16, respectively, with which engage threads 17 and 18 of caps 19 and 20, respectively, said caps serving to hold the tube in position and also holding the burner and head plate in proper engagement with the casing.

Water, when passing through the heating device enters the tube 14 through pipe 3 and in order to heat the water as it is passing through the heating device a drum 21 is placed within the tube 14 and is of slightly less diameter than the tube so as to cause the water to pass through the tube in a thin sheet, the drum also forcing the water against the wall of the tube. The drum is spaced from the tube by means of arms 22 and is held in proper relationship with the tube in any suitable manner, as by means of screws 23. The lower end of the drum 21 is provided with ports 24 which permit the water to enter the drum and gradually become heated and as the first volume of water normally remains in the drum a heated core is always provided for the volume of water passing around the drum. In order to readily ignite the gas passing through the openings 11, the casing 5 is provided with a door 25 which is hinged at one end to the casing 5 and engages a spring keeper 26 at the opposite end. The casing 5 is also provided with a plurality of openings 27 so that air can readily enter the casing and mix with the gases entering through the openings 11, thereby creating a proper combustion.

In order to provide a complete combustion and increase the heating properties of the products of combustion, a bridge wall 28 is introduced into the casing 5 a distance above the ring 8, said bridge serving to retard the passage of the product of combustion through the casing and causing all of the products of the gas to be consumed. The bridge 28 is spaced from the tube 14 so as to cause the products of combustion to be directed positively against the tube when passing from end to end of the casing. If desired, the bridge 28 may be provided with a cavity 29 and openings 30 through the upper wall of the bridge, thus providing an auxiliary burner. When the bridge is used as an auxiliary burner, pipes 31 are extended from the ring 8 to the bridge 28, the ends of the pipes communicating respectively with the burner and the cavity in the bridge and through these pipes the gas is conveyed from the burner to the bridge. In this manner of constructing the device the intensity of the heat is not only greatly increased by the retarding or choking action of the bridge, but an additional flame is provided for heating the water as it passes through the tube. If it is found that the pipes 31 will not sufficiently retain the bridge in position or when the bridge is solid, any suitable form of bracing means may be provided for retaining the bridge in position. It will likewise be seen that by extending a rib 32 around the edge of the ring 8 said ring will be fully reinforced and held against warping.

The products of combustion, after being utilized for heating the water, passes to the head plate 12 and thence through a hollow extension 33 to which is attached a pipe 34, said pipe being extended into a chimney or is otherwise directed to carry the products of combustion out of the room in which the heater is located.

It has been found that when using heaters of this class, when the water is being withdrawn from the tank, the suction thus created will be such as to draw the cold water through the heater with such rapidity that said water cannot be heated, thus cooling the water in the tank very rapidly. To overcome this objectionable feature I provide a ball valve 35 which is adapted to normally rest over and close one end of a tube 36 extending longitudinally of the drum 21 and beyond each end thereof, said tube being centrally located within the drum. The weight of the ball is such as to overcome the normal pressure of the water in the tube 36, thus keeping the end of the tube closed, but when water is being drawn from the tank 1, the suction occasioned thereby will immediately throw the ball valve 35 upwardly and into engagement with a seat 37 in the lower end of a nipple 38, said nipple being a continuation of the pipe 4. As soon as the valve has engaged its seat the flow of the water through the heating device will be immediately stopped, but as soon as the withdrawal of the water from the tank is stopped, the valve will immediately descend and seat itself over the end of the tube 36, thus permitting an additional supply of water to gradually flow through the heating device into the tank. If, on the other hand, a great quantity of water is removed from the tank the pressure of the steam arising therein will force the valve downwardly and permit a supply of water to enter the tank, thus guarding against any possibility of danger. The ball valve is held in position to always seat itself in its raised or lowered position by guards 39 which extend downwardly from the end of the nipple 38 and have their lower ends positioned around the upper end of the tube 36, thus forming a guide for the ball in its passage from the end of the tube to the seat in the nipple.

As it is sometimes difficult to arrange the threads upon the various coupling parts so as to properly engage the lower ends of the guards with the tube, the upper end of said tube is provided with exterior threads 40 so that should the ends of the guards not properly position around the end of the tube, said tube may be moved longitudinally toward the guard by rotating the same. The tube 36 is also provided with ports 41 which communicate with the interior of the drum 21 adjacent the upper end thereof, thus permitting the water within the drum to pass slowly into the tube 36. This insures that the drum will fill with water and in view of the slowness with which it passes from the drum will, when once heated, remain in a heated condition at all times. By employing this form of device it will be readily seen that I not only obtain a much greater heat and more uniform mixture of the air with the gases, but the flow of the water into the tank is so regulated that it will be practically impossible for the cold water to enter the tank when the heated water is withdrawn from the tank, thus maintaining the water in a heated condition at all times.

It will further be seen that in view of the simplicity of this device it can be manufactured and installed at a very nominal expense and further that the device can be secured to any suitable form of tank employed for retaining the heated water.

What I claim is:

1. In a heating device the combination with a casing, a burner and a water containing tube extending through the casing, of a ring-like bridge wall within the casing and above the burner, said bridge wall being spaced from the water containing tube and having its opposite edge engaged with the inner wall of the casing, whereby the travel of the products of combustion will be retarded and forced inwardly and into direct contact with the water containing tube and supporting means extending from the burner to the bridge wall.

2. In a heating device the combination with a casing, a burner therein and means to convey water through the casing and burner, of a bridge wall within the casing the outer edge of which is engaged with the inner wall of the casing and having its inner edge spaced from the water conveying means, said bridge wall having a cavity and openings therein and pipes connecting the interior of the burner with the interior of said bridge wall, whereby an auxiliary burner will be provided.

3. In a heating device the combination with a water containing tube, of a casing surrounding said tube, a burner at the lower end of the casing, a hollow ring-like bridge above the burner to retard the products of combustion through the casing said bridge having its outer edge engaged with the inner wall of the casing and its inner edge spaced from said water containing tube and a head plate at the opposite end of the casing, said head plate having an off-set portion communicating through a recess with the head plate through which the products of combustion may pass from the casing.

4. In a heating device the combination with a water containing tube and a casing surrounding and spaced from said tube, of a burner having a pair of flanges extending upwardly therefrom, a ring removably mounted upon the upper edges of said flanges, a hollow ring-like bridge above the burner, the outer edge of the bridge engaging the inner wall of the casing and the inner edge of the bridge being spaced from the tube and supporting means extending between said ring and bridge, said supporting means also being hollow.

In testimony whereof I have signed my name to this specification in the presence of two subscribing witnesses.

FRANK H. WHEELOCK.

Witnesses:
LOUISE H. PRICE,
B. M. SAGE.

---

Copies of this patent may be obtained for five cents each, by addressing the "Commissioner of Patents, Washington, D. C."